(12) United States Patent　　　　(10) Patent No.:　US 12,575,516 B2
Hamim　　　　　　　　　　　　　　　　 (45) Date of Patent: 　　Mar. 17, 2026

(54) IN-GROUND AEROPONIC PLANTER AND SYSTEM

(71) Applicant: Earthwise, Inc., Aurora, CO (US)

(72) Inventor: Alim Al Hamim, Aurora, CO (US)

(73) Assignee: Earthwise Incorporated, Aurora, CO (US)

( * ) Notice: Subject to any disclaimer, the term of this patent is extended or adjusted under 35 U.S.C. 154(b) by 0 days.

(21) Appl. No.: 17/972,194

(22) Filed: Oct. 24, 2022

(65) Prior Publication Data

US 2023/0047544 A1　　　Feb. 16, 2023

Related U.S. Application Data

(63) Continuation-in-part of application No. 29/768,140, filed on Jan. 27, 2021, now abandoned.

(51) Int. Cl.
　　 *A01G 31/02*　　　　　(2006.01)
(52) U.S. Cl.
　　 CPC .................................. *A01G 31/02* (2013.01)
(58) Field of Classification Search
　　 CPC ....... A01G 9/0291; A01G 31/00; A01G 31/02
　　 See application file for complete search history.

(56) References Cited

U.S. PATENT DOCUMENTS

| | | | | |
|---|---|---|---|---|
| 3,273,284 A | * | 9/1966 | Anagnostou | A01G 9/0291 |
| | | | | 47/74 |
| 3,744,183 A | * | 7/1973 | Kato | A01G 31/02 |
| | | | | 47/62 R |

| | | | | |
|---|---|---|---|---|
| 3,755,962 A | * | 9/1973 | Walters | F42B 25/00 |
| | | | | 102/385 |
| 4,953,322 A | * | 9/1990 | Edwards | A01G 31/02 |
| | | | | 47/64 |
| 4,976,064 A | * | 12/1990 | Julien | A01G 31/02 |
| | | | | 239/545 |
| 5,307,589 A | * | 5/1994 | Rigsby | A01G 31/02 |
| | | | | 47/62 R |
| 5,394,647 A | * | 3/1995 | Blackford, Jr. | A01G 31/02 |
| | | | | 47/62 A |
| 6,223,466 B1 | * | 5/2001 | Billings | A01G 9/02 |
| | | | | 47/75 |
| 7,418,799 B1 | * | 9/2008 | Witt | A01G 27/005 |
| | | | | 47/81 |
| 10,058,040 B2 | * | 8/2018 | Daas | A01G 9/1423 |
| 10,492,387 B1 | * | 12/2019 | Davison | A01G 31/02 |

(Continued)

FOREIGN PATENT DOCUMENTS

| | | | | |
|---|---|---|---|---|
| CN | 106489599 A | * | 3/2017 | |
| CN | 107494040 A | * | 12/2017 | |

(Continued)

*Primary Examiner* — Katelyn T Truong
(74) *Attorney, Agent, or Firm* — Kevin H. Fortin, Esq.

(57)　　　　　　ABSTRACT

An aeroponic planter for use in-ground includes a top strip for receiving plugs that are designed for holding plants. The planter has a rooting chamber capable of enabling aeroponic growth of plant roots, the rooting chamber having a base with a drain. A drain chamber mounts at the base of the rooting chamber for receiving liquid from the rooting chamber. At least one anchor mounted on each of the rooting chamber and the drain chamber for securing the aeroponic planter in soil. In an alternate embodiment, the at least one anchor is integral with the top strip.

4 Claims, 10 Drawing Sheets

(56)               References Cited

U.S. PATENT DOCUMENTS

| | | | | |
|---|---|---|---|---|
| 2012/0137581 A1 * | 6/2012 | Teasdale | ................ | A01G 31/02 47/66.7 |
| 2012/0186151 A1 * | 7/2012 | Daas | ..................... | A01G 31/02 47/58.1 R |
| 2012/0324787 A1 * | 12/2012 | Daas | ..................... | A01G 31/02 47/79 |
| 2013/0014435 A1 * | 1/2013 | Hansen | .................. | A01G 31/02 47/60 |
| 2015/0264874 A1 * | 9/2015 | Zilkha | ................... | A01G 31/02 239/302 |
| 2018/0220603 A1 * | 8/2018 | Burford | ................ | A01C 15/04 |
| 2019/0343055 A1 * | 11/2019 | Sakakibara | .......... | A01G 27/003 |

FOREIGN PATENT DOCUMENTS

| | | | | | |
|---|---|---|---|---|---|
| CN | 110741845 A | * | 2/2020 | .......... | A01G 9/0291 |
| KR | 101183494 B1 | * | 9/2012 | | |
| KR | 101293652 B1 | * | 8/2013 | | |
| WO | WO-2017068592 A1 | * | 4/2017 | ............. | A01C 21/00 |

* cited by examiner

1

IN-GROUND AEROPONIC PLANTER AND SYSTEM

CROSS-REFERENCE TO RELATED APPLICATION

This patent application is a continuation-in-part of commonly assigned and co-pending U.S. Design Pat. application No. 29/768,140, filed Jan. 27, 2021, the disclosure of which is incorporated herein by reference.

FIELD OF THE INVENTION

This invention relates to aeroponic systems for growing crops, and particularly to aeroponic systems that are capable of in-ground placement and operation.

BACKGROUND OF THE INVENTION

Aeroponics is a process of growing plants whose roots are immersed in humid air, or mist as a growth medium. There is typically no need for soil or aggregate growth medium. There are various benefits to aeroponic systems. One is that pathogens are more easily controlled compared to soil based systems. Another benefit is the provision of an oxygen rich rhizosphere. A further benefit is that the nutrients can be precisely controlled and dispensed. If these benefits are not enough, a further benefit is that water can be precisely delivered and not wasted.

There are high pressure aeroponic systems and low pressure systems. In low pressure systems, a pump delivers nutrients in solution via jets or by ultrasonic transducers. Excess solution is re-captured in a reservoir and re-used.

High pressure commercial systems typically use a high-pressure sprays and enhancements including precision timing, nutrient solution pressurization, heating and cooling sensors, efficient light arrays, pathogen sensors, and many other features. Such High pressure commercial systems are expensive to build and operate, particularly when such systems are used indoors, with artificial lighting, water purification, nutrient sterilization, and low-mass polymers.

Aeroponic culturing has revolutionized cloning of the cuttings of certain agricultural plants and nursery operations. However, there has not yet been seen a mass adoption of aeroponics as a standard technique in commercial agricultural.

SUMMARY OF THE INVENTION

Many crops can be grown with the present invention including corn, vegetables, beans, bushes, leafy vegetables, berries, and other agricultural crops.

One of the benefits of the present invention is that crops are maintained in an upright orientation. The present invention is also particularly useful where water is in short supply or where the soil is composed of undesirably high concentrations of rocks, sand, clay, toxins, or has poor nutrient concentrations.

Delivering nutrients via an aeroponic system hastens the growth cycle of most plants, and thus the present system can be deployed where the growing season is short. It can also be deployed in an urban area having tall structures, and where the incident solar rays are encumbered during time periods other than the summer solstice.

The present invention can also be deployed in mountainous regions having short growing seasons; and where soil is difficult to till, is rocky, and has poor nutrient concentrations.

Accordingly, the present invention includes an aeroponic planter that uses high pressure spray between 80-120 psi to generate a mist of nutrient solution having droplet sizes of between 20-50 microns to optimize uptake from plant roots. The present system is distinct in that it is for use in-ground. It includes a top strip for receiving plugs that are designed for holding plants and anchor components that hold the present invention in place in soil.

The plugs are cylindrical in shape, flexible, and having a central opening. The plugs have cuts that extend radially from the central opening to enable insertion and removal of seeds, sprouts, seedlings, and propagatable plant material into and out from the plugs.

The planter has an integrated rooting chamber having a top. The top strip is removeably mounted on the top of the rooting chamber. The rooting chamber is capable of enabling aeroponic growth of plant roots. The rooting chamber has a base with a drain. The rooting chamber includes high pressure tubes capable of handling between 80-120 psi solution, and spraying tips to deliver aqueous nutrients to the rooting chamber in a mist having droplet sizes of between 20-50 microns. Gravity removes excess aqueous solution and other particles that condense, agglomerate, or congeal; and drip via the drain.

The planter has an integrated drain chamber mounted at the base of the rooting chamber in fluid communication with the drain. In this way, after aqueous nutrients are sprayed or misted into the rooting chamber, excess fluid drains into and is received by the drain chamber. Draining the excess fluid exposes the roots to oxygen and inhibits pathogenic growth on the roots.

The aeroponic planter includes at least one anchor mounted on each of the rooting chamber and the drain chamber for securing the aeroponic planter in soil. The anchors can have various shapes, and mounting arrangements to keep the aeroponic planter oriented having the top strip facing the sky, or perpendicular to the ground.

In one embodiment of the invention, the top strip defines a central axis, and a plurality of planter plug bores along the central axis for receiving planter plugs. It can be appreciated that there can be more than one central axis in various embodiments of the invention, and more than one row of planter plug bores. Further, the planter plug bores need not necessarily be centrally aligned, but may also be aligned on one or more edges of the top strip. In either case, the planter plug bores receive removable planter plugs.

Preferably, the top strip is bifurcated into two halves along the central axis and is expandable to enable automated implanting and removing the planter plugs from the planter plug bores. Thus, when the present invention is used in soil, such as in a field or in a green house, the top strip expands to release aeroponically grown plants to a manual harvester, or automatic harvesting machine.

In a preferred embodiment, the top strip includes embedded magnets along each of the two halves to releasably hold the bifurcated top strip together. Soil and cellulosic debris are anticipated to be present and magnetic holding of the top strip halves is optimal because it works even in the presence of soil. However, it is also appreciated that lower price press fit, or latch mechanisms may also function to releasably hold the two halves, or other parts of the top strip together.

The rooting chamber has a top portion with two sides, one anchor extends from each of the two sides of the top portion.

The drain chamber has a bottom portion with two sides, one anchor extends from each of the two sides of the bottom portion.

In one embodiment of the invention, the rooting chamber has a top portion with two sides and the drain chamber has a bottom portion with two sides. At least one anchor extends from each of the two sides of the top portion and each of the two sides of the bottom portion. Thus four anchors hold the aeroponic planter in soil during operation. The anchors are foldable for storage, transportation and deployment in a soil trench dug and prepared to receive the aeroponic planter. Once deployed the anchors fold out from the two sides of the rooting chamber.

It can be appreciated that there are alternate embodiments of the anchors, where all four anchors attach between the rooting chamber and the drain chamber in a butterfly like profile. In another embodiment, more than four anchors are used.

Preferably, the rooting chamber has a top portion with two sides, one anchor extends from each of the two sides of the top portion and each of said anchors are planar in shape.

In another embodiment, the aeroponic planter is embedded in soil. The rooting chamber has a top portion with two sides, one anchor extends from each of the two sides of the top portion, each of said anchors are planar in shape and include a plurality of holes to enable plant roots growing in the soil to grip and hold each of said anchors. Accordingly the anchors hold the soil and cooperate with plant roots from plants growing adjacent the aeroponic planter in the soil to hold the anchors.

In one embodiment of the invention, the anchors have a gull wing profile. In another embodiment, the top strip has two sides. The top strip has integrated and laterally extending anchors mounted on each of the two sides. In this embodiment, the anchors are fixed and do not hinge as in other embodiments.

In a preferred embodiment of the invention, the aeroponic planter has a proximal end connected to a manifold for delivering pressurized aqueous nutrients to a parallel array of aeroponic planters arranged in systematic manner. Ideally the aeroponic system is a high pressure aqueous spray system that maintains system pressure throughout the system at between 80 psi and 120 psi, and more preferably at 105 psi+/−10%.

The aeroponic planter also has a distal end. An end cap mounts on the distal end to prevent soil and other material from contaminating the root chamber and the drain chamber. The end cap defines an opening in fluid communication with the drain chamber, and at least one opening for enabling wires to extend through the end cap to monitor the aeroponic planter.

The rooting chamber includes pressure lines and nozzles attached to the spray lines for delivering nutrients in an aqueous spray to the rooting chamber. In an alternate embodiment, the rooting chamber includes high pressure lines and nozzles attached to the spray lines for delivering nutrients in an aqueous mist to the rooting chamber.

The rooting chamber includes sensors for detecting moisture content in the rooting chamber, the sensors being in electrical communication with a controller and a pump, the pump is in fluid communication with the pressure lines, and is activated by the sensors via the controller.

The top strip, in one embodiment, includes hooked ridges aligned in parallel to the central axis for aligning and slidably securing a harvesting device along the central axis, the harvesting device should ideally be capable of implanting and removing the planter plugs along with the vegetation contained by the planter plugs. In one embodiment the planter plugs implanted include at least one seed.

DETAILED DESCRIPTION

Figure 1:
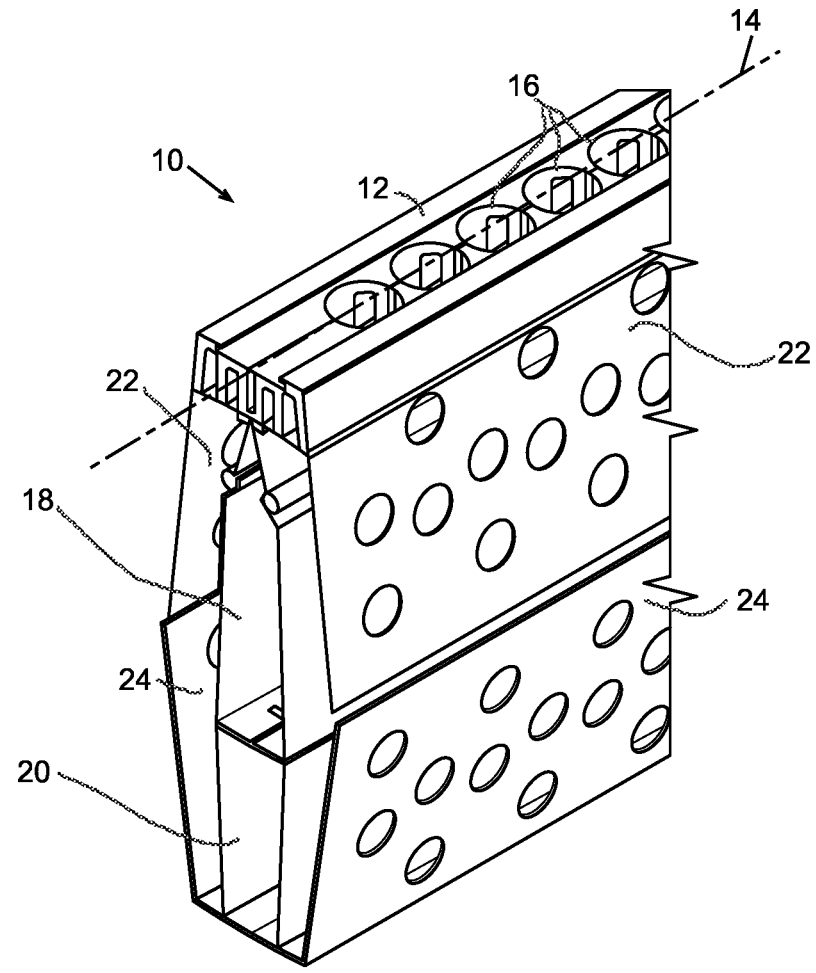
FIG. 1 is a perspective view of one end of an aeroponic planter.

FIG. 1 is a perspective view of an aeroponic planter in accordance with the present invention, generally designated with the reference numeral 10. The planter 10 includes a top strip 12 having an axis 14 and a plurality of planter plug bores 16 defined on the top strip 12, along the axis 14. The planter 10 further includes a rooting chamber 18, a drain chamber 20, a pair of upper anchors 22 mounted on a top portion of the rooting chamber 18 and a pair of lower anchors 24 mounted on a lower portion of the drain chamber.

The aeroponic planter 10 can rolled and packaged in a roll that is tens or hundreds of feet long. The rolled planter can be deployed in soil that is prepared by a trencher and buried, except for the top strip. Numerous planters 10 can be deployed in an array on acreage of tillable agricultural land, in green houses, or even in a small garden plot. Systems for delivering pressurized aqueous nutrients connect to the aeroponic planter 10. Preferably the pressure is between 80-120 psi.

Figure 2:
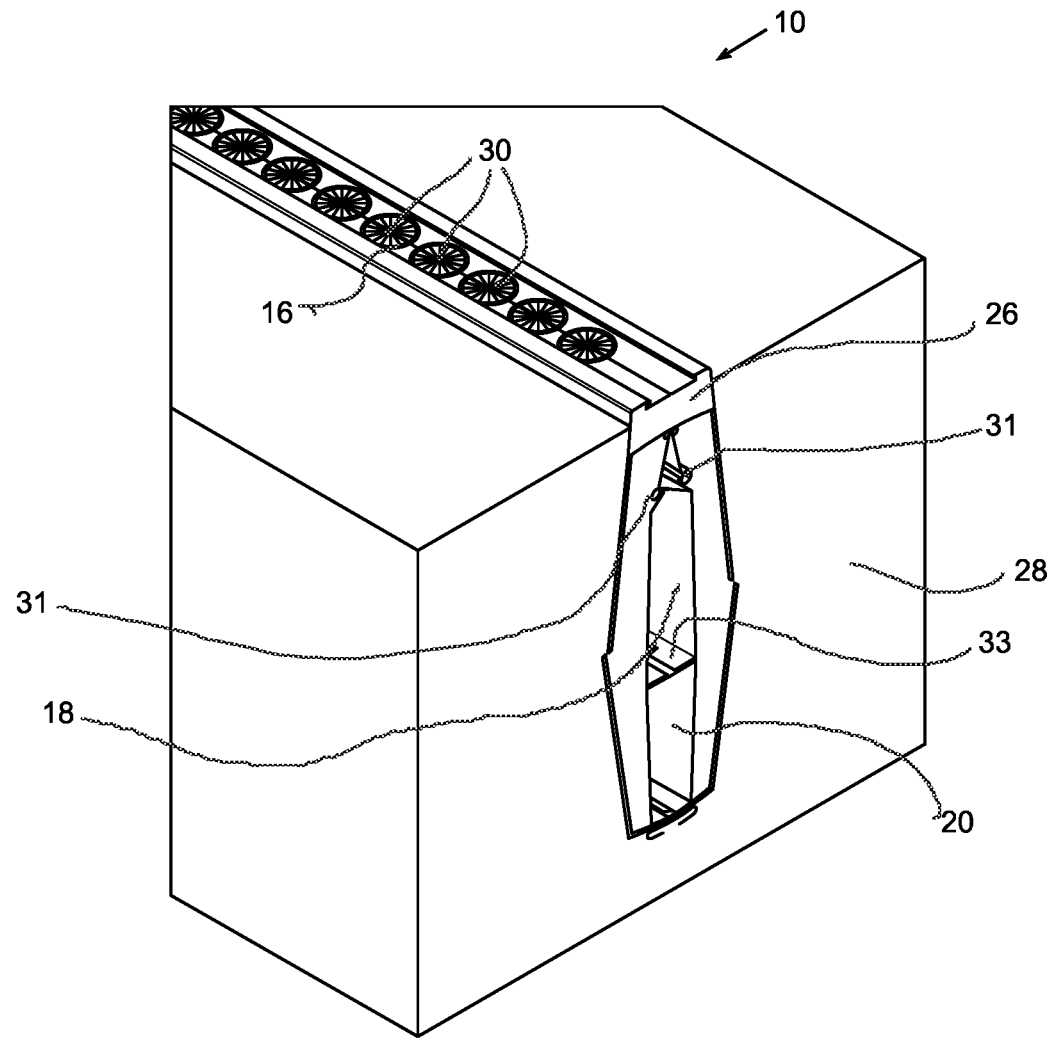
FIG. 2 is a perspective view of the end of the aeroponic planter of FIG. 1 operatively immersed in-ground.

FIG. 2 shows a side perspective view of the distal end 26 of the planter 10. The planter 10 is embedded in soil 28, or other solid media. Planter plugs 30 are press fit into planter plug bores 16.

The planter 10 includes high pressure tubing 31 formed with jets that mist any contents of the rooting chamber 18, such as roots. The rooting chamber 18 is further equipped with a drain section 33 at the base of the rooting chamber 18. The drain section 33 has openings to allow excess aqueous nutrients and water to drip into the drain chamber 20 so that the roots will not be submerged in water or aqueous solution. This enables oxygen from ambient air to inhibit pathogenic growth on the roots of plants in the rooting chamber 18.

The plug bores 16 extend directly to the rooting chamber 18 so that roots extend unencumbered into the rooting chamber 18 via the plug bores 16 and the plugs 30.

Figure 3:
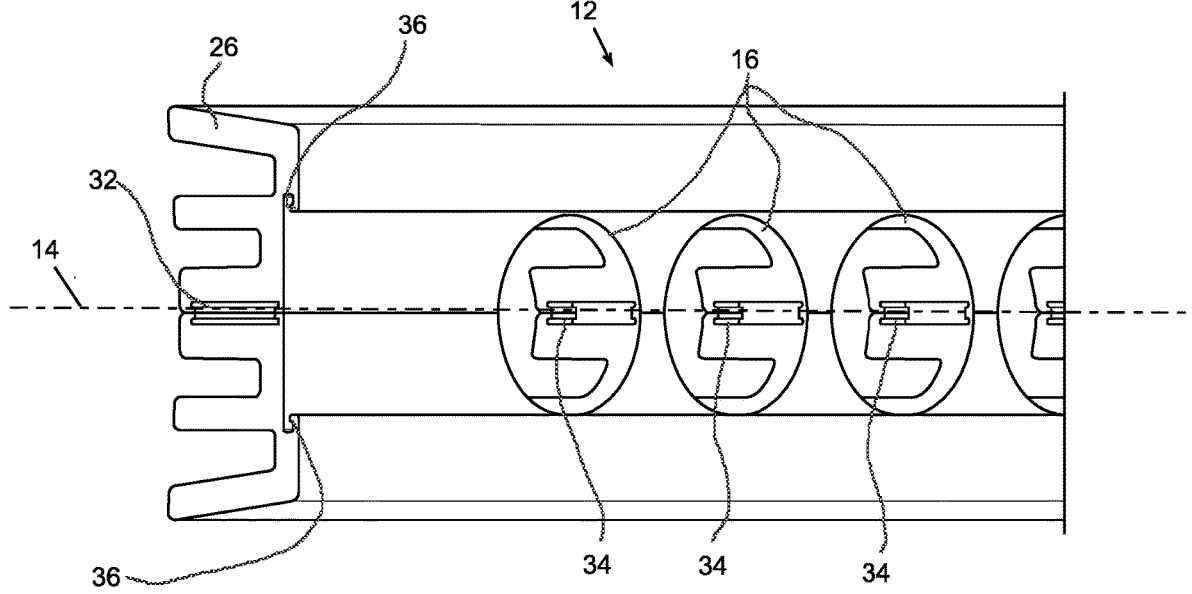
FIG. 3 is a top perspective view of a top strip usable with the aeroponic planter of FIG. 1.

FIG. 3 shows a top perspective view of the top strip 12 having a plurality of planter plug bores 16. The top strip 12 is bifurcated into two halves along the axis 14. The top strip 12 includes embedded magnets 32 and 34 along each of the two halves to releasably hold the bifurcated top strip 12 together. The magnets 34 are positioned between adjacent planter plug bores 16. The magnet 32 is positioned along the axis 14 and is visible at the distal end 26 of the top strip 12. Each half of the top strip 12 includes a ridge 36 for aligning a harvester to separate the halves of the top strip 12 along the axis 14 and to either pull the plants from the planter plug bores 16, or to optionally align a harvesting blade along the top strip 12 for harvesting plants grown in accord with the present invention. In an alternate embodiment, upon separation of the halves of the top strip, the planter bore plugs 30 are pulled from the top strip 12. The planter bore plugs 30 are shown in FIG. 2.

In another embodiment, the ridges 36 align in parallel to the central axis 14 for aligning a harvesting device along the central axis 14. The harvesting device being capable of implanting and removing the planter plugs from the bores 16. It can be appreciated that the top strip 12 and the planter 10 may not be utilized in a linear format and may curve with contours of an agricultural plot. Accordingly, the terms axis, parallel, etc. are intended to be general concepts that fit the contours of the use case an not mathematical statements of precision.

Figure 4:
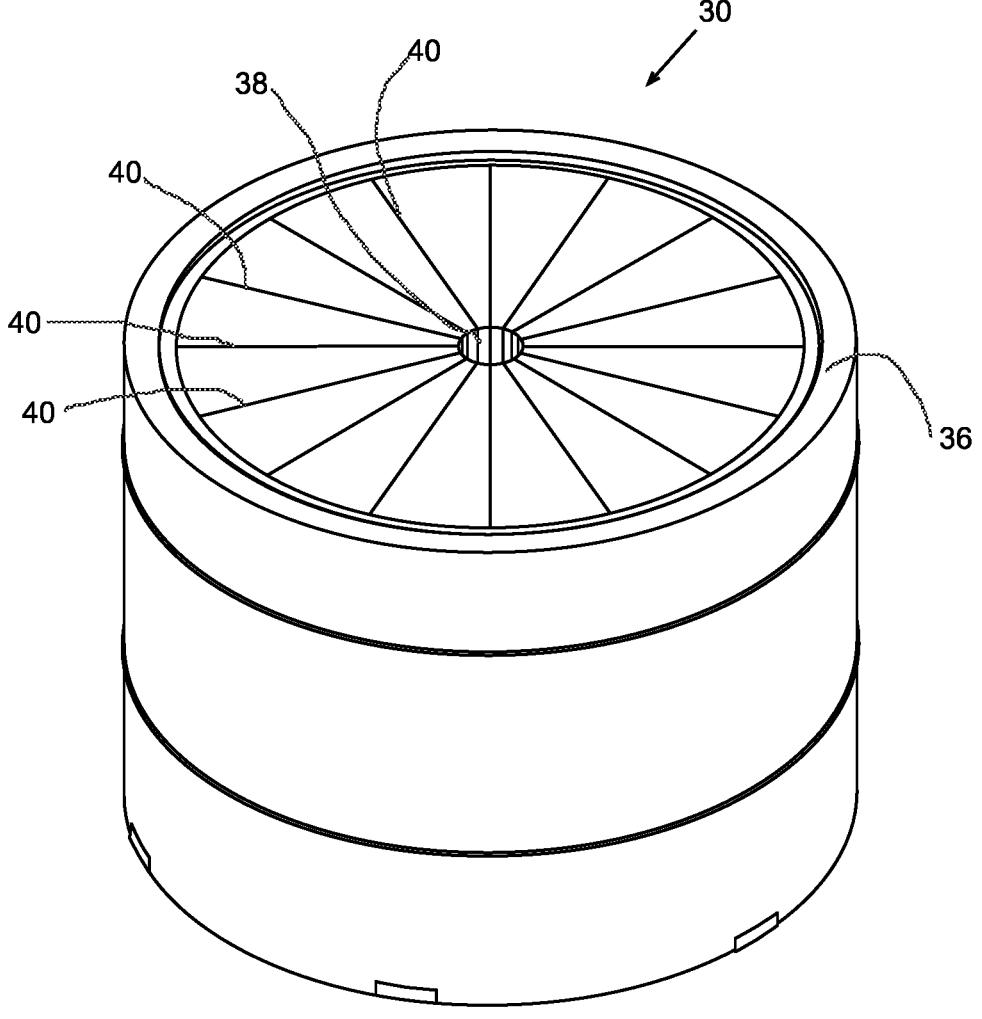
FIG. 4 is a top perspective view of a planter plug.

FIG. 4 is a planter bore plug 30. The plug 30 has a continuous cylindrical outer region 36, a central opening 38, and radial lines 40 cut from the outer region 36 to the central opening 38. The central opening 38 and the radial cuts 40 cooperate to enable a seed, sprout, or stem to insert into the planter bore plug 30 for planting in the aeroponic planter 10 of the present invention.

Figure 5:
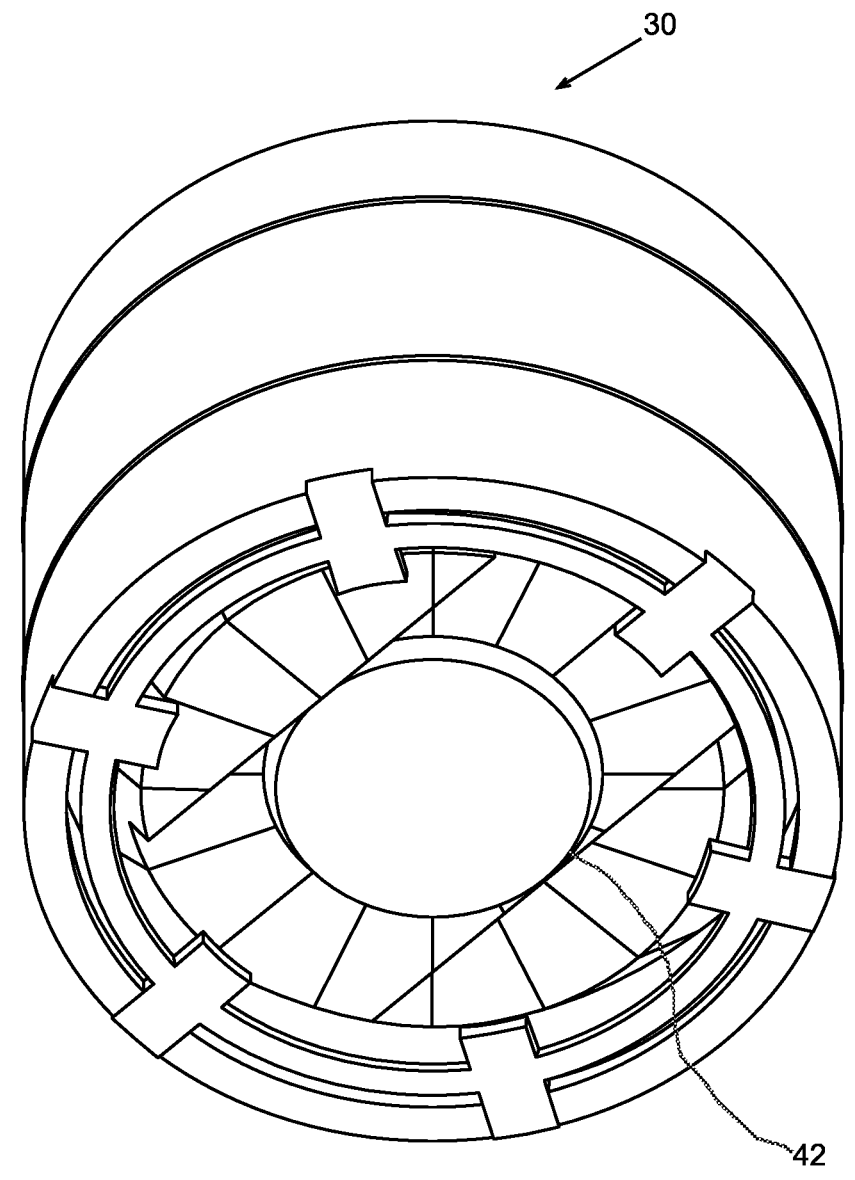
FIG. 5 is a bottom perspective view of a planter plug.

FIG. 5 is a bottom perspective view of the planter bore plug 30. The bottom of the planter bore plug 30 defines a root opening 42, which is a wider opening than the central opening of plug 30. The root opening 42 enables root structures to expand and grow out through the root opening 42 towards the rooting chamber 18 (FIG. 1).

Figure 6:
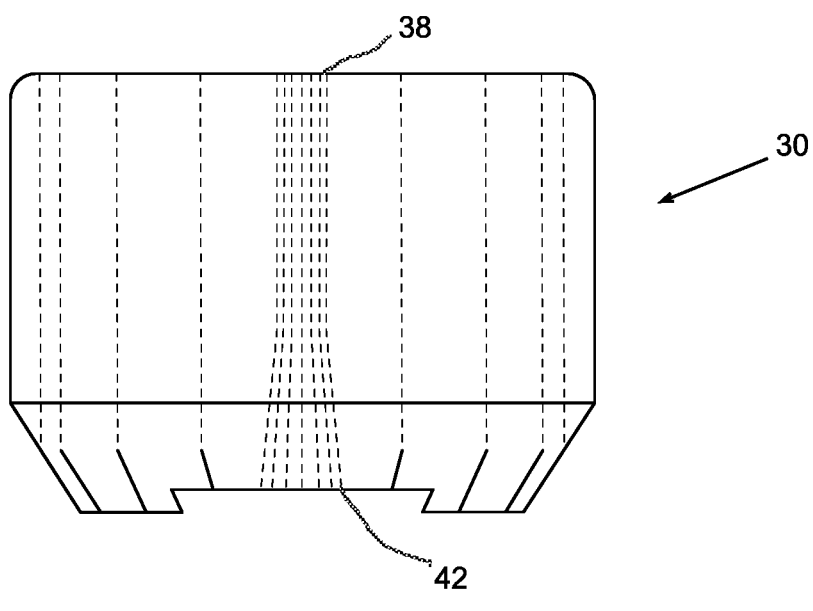
FIG. 6 is a side view of the planter plug of FIG. 4.

FIG. 6 is a side view of the plug 30. Dotted lines show the central opening 38 having a narrower structure than the root opening 42. Thus, the root opening 42 enables roots to expand through the plug 30 into the rooting chamber, which the central opening 38 is relatively narrower to hold any plant in an upright configuration.

Figure 7:
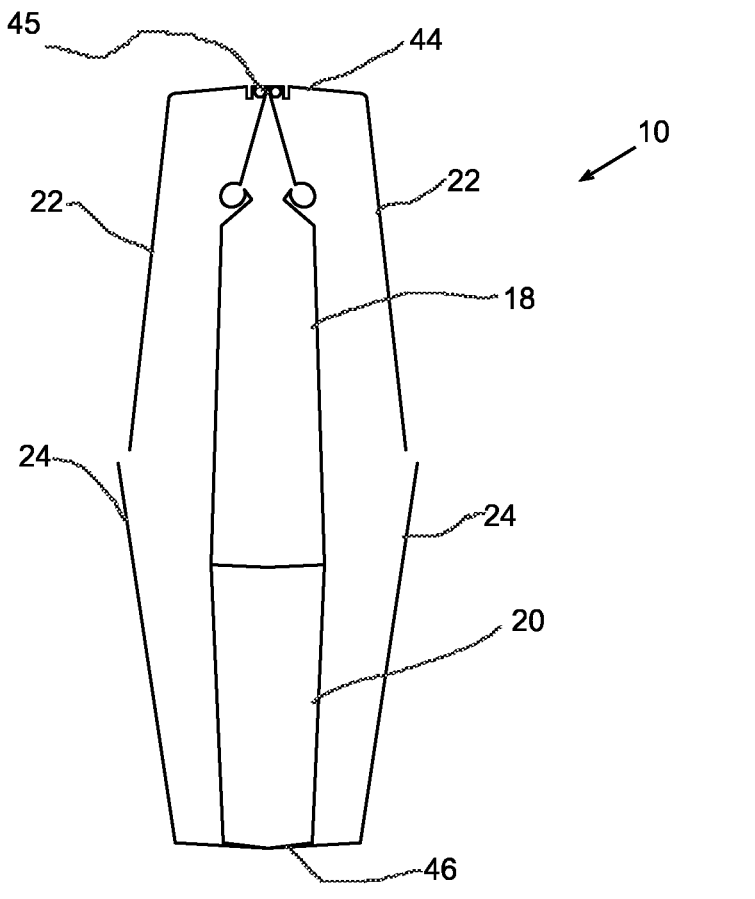
FIG. 7 is an end view of one embodiment of the aeroponic planter of FIG. 1 having laterally extending anchors.

FIG. 7 shows an embodiment of the aeroponic planter 10 having a top portion of the rooting chamber 18, and a bottom portion 46 of the drain chamber 20. The anchors 24 attach to the bottom portion 46, and the anchors 22 attach to the top portion 44. One anchor 22 and 24, each extends from a respective side of the aeroponic planter 10. These anchors 22 and 24 are hinged to the respective sides of the aeroponic planter 10 in one embodiment of the invention, and fixed in another. The material of the anchors can be flexible to enable the hinged attachment.

The top portion 44 defines space 45 to enable roots to extend through the top portion 44 into the rooting chamber 18 unencumbered.

Figure 8:
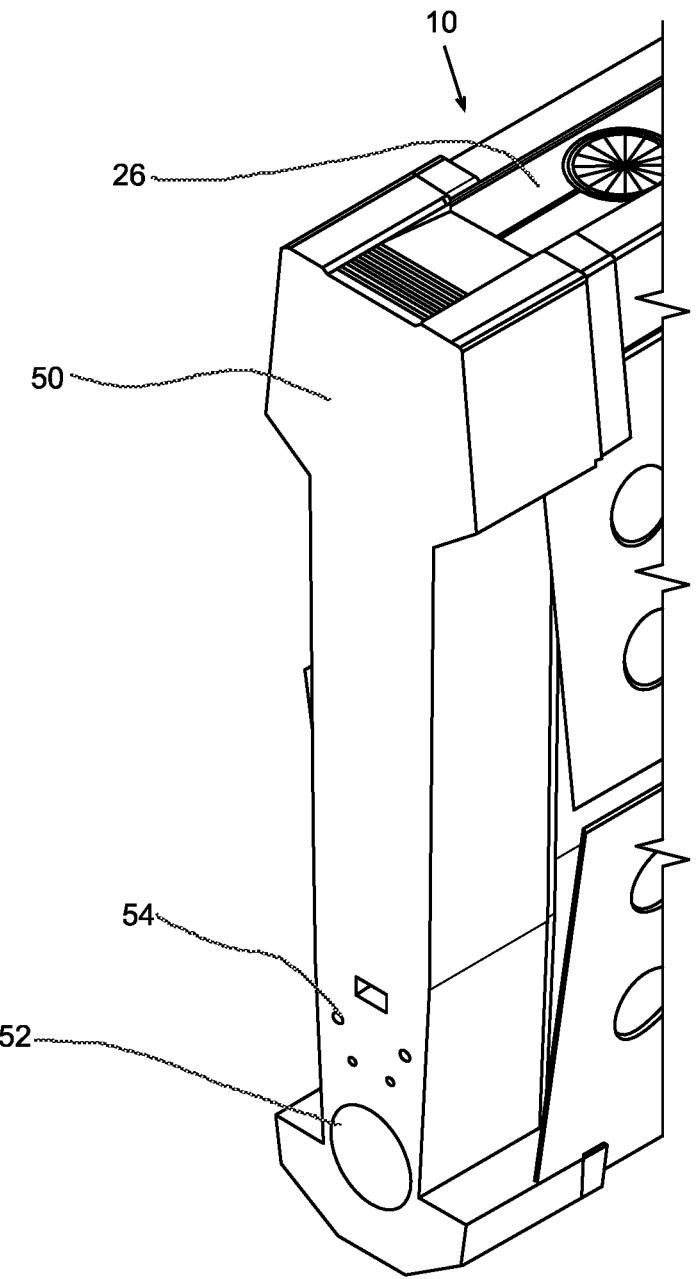
FIG. 8 is an end view of an embodiment of the aeroponic planter with an end cap.

FIG. 8 shows the distal end 26 of the aeroponic planter 10. An end cap 50 attaches in a press fit to the distal end 26 to seal the rooting chamber and the drain chamber. In another embodiment, the end cap 50 is glued or integral with the distal end 26.

The end cap 50 defines a drain opening 52 in fluid communication with the drain chamber. At least one opening 54 enables wires to extend through the end cap to monitor the aeroponic planter 10 with electrical connections. In an alternate embodiment, wireless communication links various pressure, temperature, and nutrient sensors in the system of the present invention.

Figure 9:
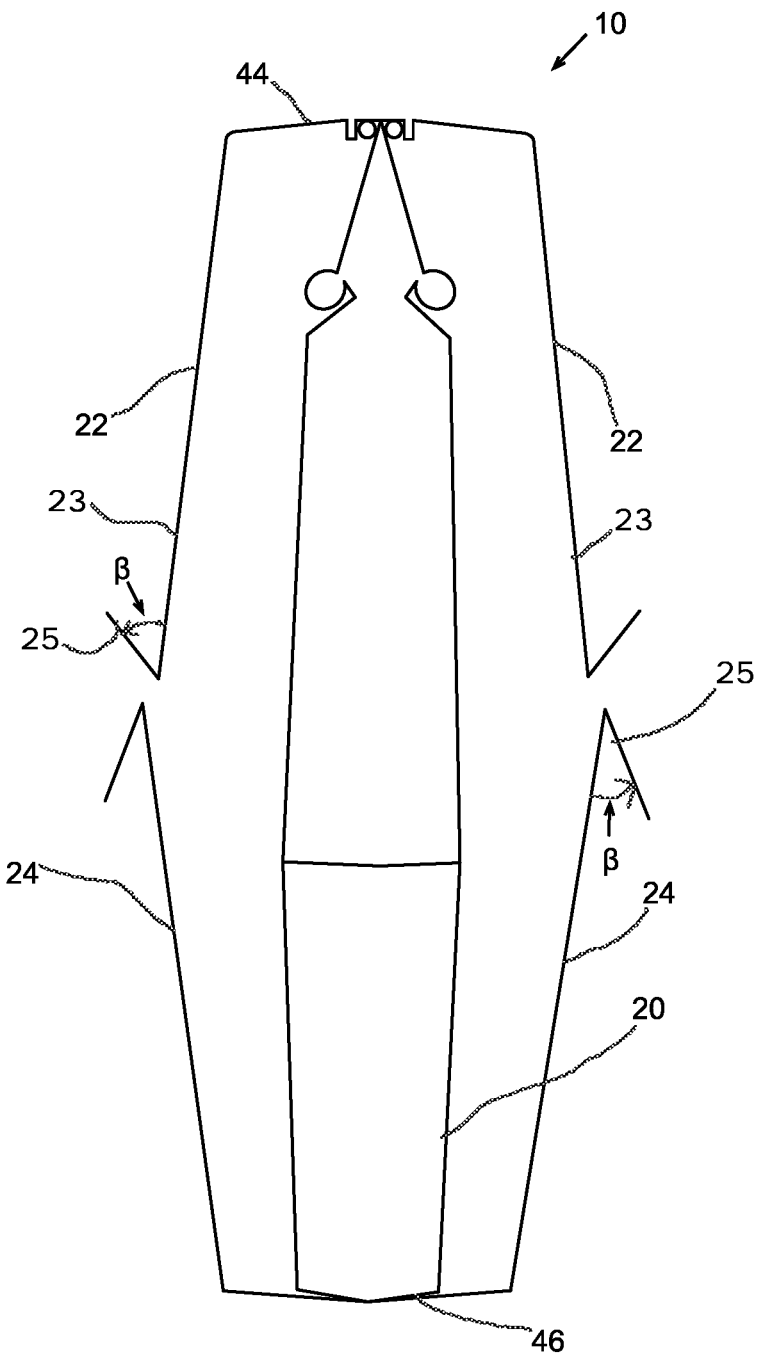
FIG. 9 is an end view of one embodiment of the aeroponic planter having gull wing anchors.

FIG. 9 shows an end view of the aeroponic planter 10 having particularly shaped anchors. Anchor 22 and 24 are each configured with a gull wing shape. In particular, each anchor 22 and 24 have a first planar portion 23 having one edge attached to the aeroponic planter 10 and another planar portion 25 having a free end. The first planer portions 23 and the second planar portions 25 are attached at an acute angle β to form the gull wing shape.

Figure 10:
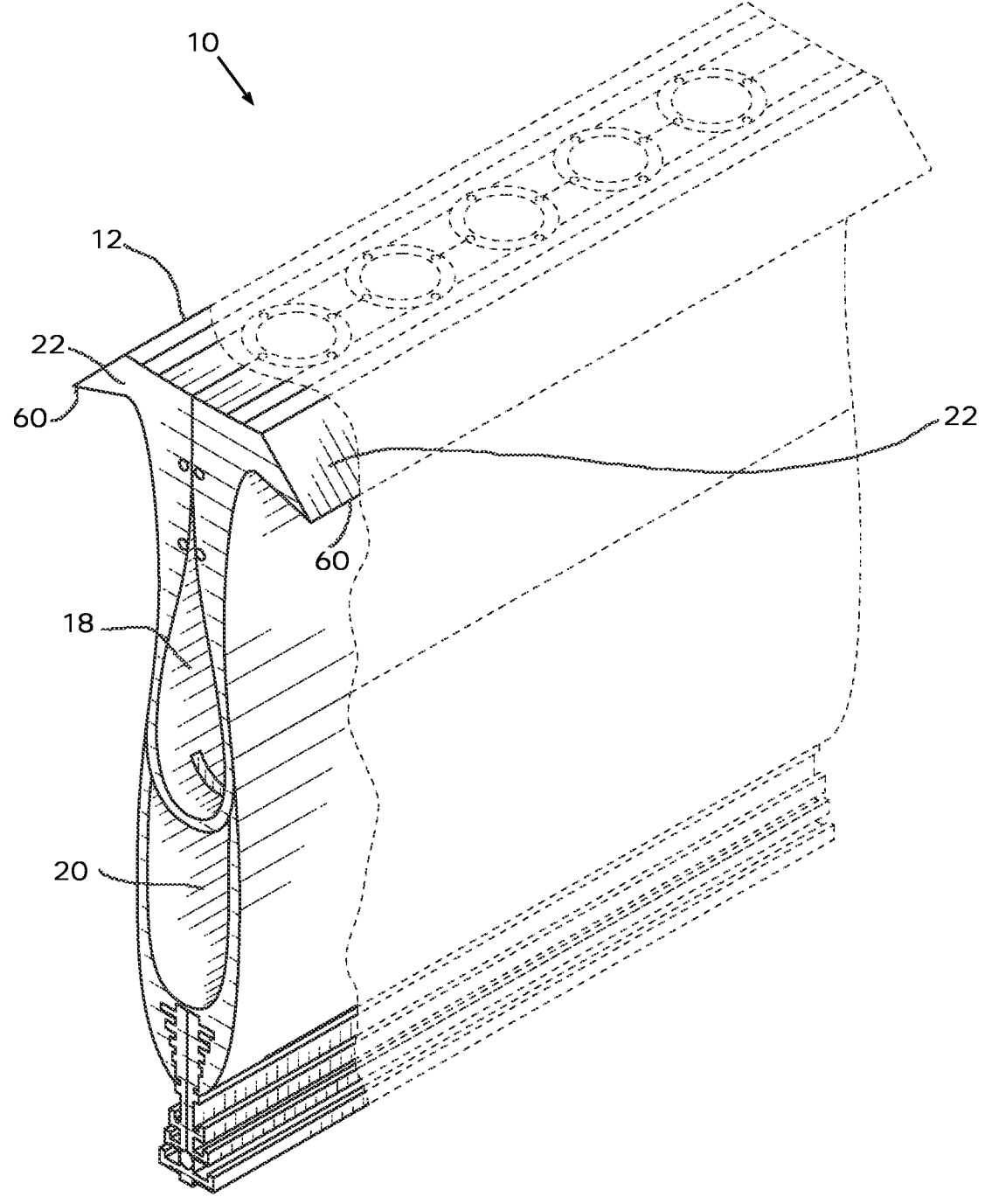
FIG. 10 is a perspective view of one embodiment of the aeroponic planter having opposing lateral anchors mounted on an integrated top strip.

FIG. 10 is an aeroponic planter generally designated with the reference numeral 10. The planter 10 has an alternate exemplary configuration. The planter 10 has a rooting chamber 18 and a drain chamber 20 below the rooting chamber 18. A top strip 12 is above the rooting chamber 18. The top strip 12, the rooting chamber 18 and the drain chamber are all formed as a unitary structure.

The top strip 12 includes two laterally extending anchors 22 that are integral with, and define, edges of the top strip 12. The anchors 22 each have a tapered edge 60 that points relatively downward towards soil during operation. The anchors 22 and the edge 60, hold the planter 10 in a fixed position so that the top strip 12 aligns with a growth media surface such as soil.

Figure 11:
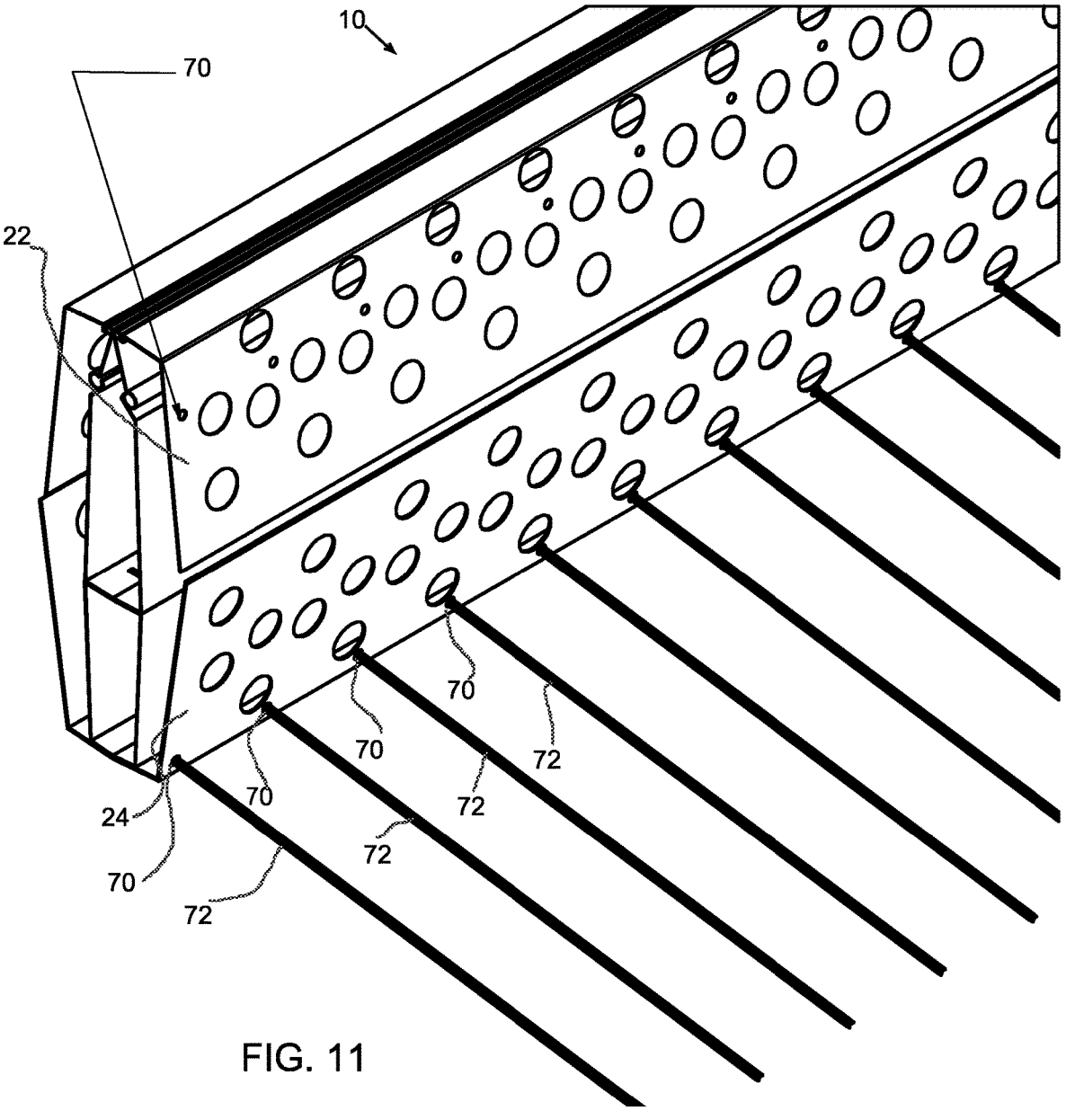
FIG. 11 is a perspective view of the aeroponic planter of FIG. 1 having lateral stabilization rods that enable an array of planters to interconnect.

FIG. 11 is the planter 10 having a plurality of rod holes 70 on lateral sides of the anchors 22 and 24, and rods 70 extending laterally from the rod holes 70 to interconnect with an adjacent planter so that arrays of planters 10 can be interconnected structurally. This further stabilizes the planters 10 to enable taller crops to grow therein, such as corn.

While the present invention is described in terms of various embodiments, the true scope of the invention is described in the appended claims. In particular, the anchor system can include any of a variety of configurations to hold plants in soil, including ways to enable roots of nearby plants to envelope and hold the anchors without interfering with the growth of plants held by and nourished by the planter 10. In sum, the planter 10 enables independent plant nourishment, hydration, and structural rooting which is independent of surrounding vegetation. The present system can thus be interspersed between rows of conventional crops.

In an orchard setting, plants that repel pathogenic insects can be planted in the planter 10 between rows of fruit trees, for example. Further, rows of synergistic plants can be interspersed between rows of planters 10, to attract pollinators, for example. There are many other reasons to use the present invention independently or together with conventional agricultural methods.

I claim:

1. An aeroponic planter for use in-ground, comprising:
   a top strip with planter plug bores for receiving planter plugs that are designed for holding plants;
   a rooting chamber capable of enabling aeroponic growth of plant roots, the rooting chamber having a base with a drain;
   a drain chamber mounted at the base of the rooting chamber for receiving liquid from the rooting chamber;
   at least one anchor mounted on each of the rooting chamber and the drain chamber for securing the aeroponic planter in soil;
   the top strip is bifrucated in two halves along a central axis of the top strip and is expandable to enable automated implanting and removing the planter plugs from the planter plug bores, and
   the top strip includes ridges aligned in parallel to the central axis of the top strip for aligning a harvesting device along the central axis of the top strip so that a harvesting device capable of implanting and removing the planter plugs can be utilized.

2. The aeroponic planter as set forth in claim 1 further comprising the planter plugs with plants, the planter plugs are press fit into the top strip for inserting the plants into the aeroponic planter.

3. The aeroponic planter as set forth in claim 1, wherein the at least one anchor is hinged to the rooting chamber and the drain chamber, respectively.

4. The aeroponic planter as set forth in claim 1, wherein the at least one anchor is integral with the top strip.

\*    \*    \*    \*    \*